United States Patent
Derks et al.

(10) Patent No.: US 9,915,762 B2
(45) Date of Patent: Mar. 13, 2018

(54) ARTICLES WITH BINDER-DEFICIENT SLIP COATING AND METHOD FOR MAKING SAME

(71) Applicant: 3M INNOVATIVE PROPERTIES COMPANY, St. Paul, MN (US)

(72) Inventors: Kristopher J. Derks, Woodbury, MN (US); Jeffrey W. Hagen, Woodbury, MN (US); James E. Lockridge, St. Paul, MN (US); Jeffrey A. Peterson, North St. Paul, MN (US); Brent A. Hedding, Hudson, WI (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 221 days.

(21) Appl. No.: 14/422,911

(22) PCT Filed: Aug. 20, 2013

(86) PCT No.: PCT/US2013/055672
§ 371 (c)(1),
(2) Date: Feb. 20, 2015

(87) PCT Pub. No.: WO2014/031573
PCT Pub. Date: Feb. 27, 2014

(65) Prior Publication Data
US 2015/0226883 A1    Aug. 13, 2015

Related U.S. Application Data

(60) Provisional application No. 61/691,680, filed on Aug. 21, 2012, provisional application No. 61/691,688, filed on Aug. 21, 2012.

(51) Int. Cl.
*G02B 1/12* (2006.01)
*B32B 27/08* (2006.01)
(Continued)

(52) U.S. Cl.
CPC ............... *G02B 1/12* (2013.01); *B05D 1/265* (2013.01); *B05D 3/04* (2013.01); *B05D 3/12* (2013.01);
(Continued)

(58) Field of Classification Search
CPC ...... Y10T 428/24975; Y10T 428/2495; B29K 2995/0072; B29K 2995/0074; G02B 1/12;
(Continued)

(56) References Cited

U.S. PATENT DOCUMENTS 3,968,183 A    7/1976  Hayashi
4,302,506 A    11/1981 Heberger
(Continued)

FOREIGN PATENT DOCUMENTS

CN    101284435    10/2008
CN    101298203    11/2008
(Continued)

OTHER PUBLICATIONS

International Search Report for PCT International Application No. PCT/US2013/055672 dated Nov. 7, 2013, 3 pages.
(Continued)

*Primary Examiner* — Jeffrey Wollschlager
(74) *Attorney, Agent, or Firm* — Gregory D. Allen

(57) ABSTRACT

A sheet comprising: (1) a core member comprising one or more layers and having a first major surface and (2) a slip control layer disposed on at least a portion of the first major surface, wherein the slip control layer comprises: (i) a footing layer disposed on at least a portion of the first major surface of the core member, (ii) a binder layer disposed on the footing layer, and (iii) an array of particles disposed in the binder layer and footing layer and protruding therefrom, wherein the average diameter of the particles is greater than the combined thickness of the foot layer and binder layer. A
(Continued)

process for making such a sheet comprising: (1) providing a core member; (2) forming a footing layer on at least a portion of the first major surface of the core member, wherein the footing layer is viscoelastic and has a $T_g$ that is lower than either the $T_g$ or the $T_m$ of the polymer at the first major surface of the core member; (3) applying a binder layer composition comprising a film forming polymer and particles to the surface of the footing layer; then (4) tentering the assembly under sufficient heat to soften the footing layer such that the particles sink into the footing layer, wherein the average diameter of the particles is greater than the combined thickness of the footing layer and binder layer.

17 Claims, 1 Drawing Sheet

(51) Int. Cl.

| | | |
|---|---|---|
| *B32B 27/20* | (2006.01) | |
| *B32B 27/36* | (2006.01) | |
| *G02B 1/14* | (2015.01) | |
| *G02B 1/10* | (2015.01) | |
| *B05D 1/26* | (2006.01) | |
| *B05D 3/04* | (2006.01) | |
| *B05D 3/12* | (2006.01) | |
| *B32B 7/12* | (2006.01) | |

(52) U.S. Cl.
CPC ............... *B32B 7/12* (2013.01); *B32B 27/08* (2013.01); *B32B 27/20* (2013.01); *B32B 27/36* (2013.01); *G02B 1/105* (2013.01); *G02B 1/14* (2015.01); *B29K 2995/0072* (2013.01); *B29K 2995/0074* (2013.01); *B32B 2255/10* (2013.01); *B32B 2255/26* (2013.01); *B32B 2264/025* (2013.01); *B32B 2307/412* (2013.01); *B32B 2307/702* (2013.01); *B32B 2307/746* (2013.01); *Y10T 428/2495* (2015.01); *Y10T 428/24975* (2015.01)

(58) Field of Classification Search
CPC .......... G02B 1/14; G02B 1/105; B32B 27/36; B32B 27/20; B32B 7/12; B32B 27/08; B32B 2264/025; B32B 2307/412; B32B 2307/702; B32B 2255/26; B32B 2255/10; B32B 2307/746; B05D 1/265; B05D 3/04; B05D 3/12
See application file for complete search history.

(56) References Cited

U.S. PATENT DOCUMENTS

| | | | |
|---|---|---|---|
| 4,328,274 A * | 5/1982 | Tarbutton | A63C 17/01 428/142 |
| 5,161,041 A | 11/1992 | Abileah | |
| 5,302,459 A | 4/1994 | Kim | |
| 5,328,755 A | 7/1994 | Mills | |
| 5,332,617 A | 7/1994 | Mills | |
| 5,674,443 A | 10/1997 | Lee | |
| 5,771,328 A | 6/1998 | Wortman | |
| 5,773,126 A | 6/1998 | Noritake | |
| 5,783,283 A | 7/1998 | Klein | |
| 5,795,528 A | 8/1998 | Klein | |
| 5,828,488 A | 10/1998 | Ouderkirk | |
| 5,882,774 A | 3/1999 | Jonza | |
| 5,919,551 A | 7/1999 | Cobb, Jr. | |
| 6,080,467 A | 6/2000 | Weber | |
| 6,268,961 B1 | 7/2001 | Nevitt | |
| 6,277,471 B1 | 8/2001 | Tang | |
| 6,280,063 B1 | 8/2001 | Fong | |
| 6,354,709 B1 | 3/2002 | Campbell | |
| 6,368,699 B1 | 4/2002 | Gilbert | |
| 6,592,950 B1 * | 7/2003 | Toshima | C08J 7/047 427/164 |
| 6,673,425 B1 | 1/2004 | Hebrink | |
| 6,759,113 B1 | 7/2004 | Tang | |
| 6,827,886 B2 | 12/2004 | Neavin | |
| 6,872,458 B1 | 3/2005 | Rudd | |
| 7,094,461 B2 | 8/2006 | Ruff | |
| 7,269,327 B2 | 9/2007 | Tang | |
| 7,269,328 B2 | 9/2007 | Tang | |
| 7,630,031 B2 | 12/2009 | Ito | |
| 7,914,881 B2 | 3/2011 | Detlef | |
| 7,997,743 B2 | 8/2011 | Suzuki | |
| 8,182,924 B2 | 5/2012 | Hebrink | |
| 8,325,418 B2 * | 12/2012 | Nagahama | G02B 1/118 359/488.01 |
| 2001/0033913 A1 * | 10/2001 | Murata | G02B 5/0226 428/143 |
| 2002/0057564 A1 | 5/2002 | Campbell | |
| 2005/0003157 A1 * | 1/2005 | Shortland | D06N 3/06 428/143 |
| 2005/0169562 A1 | 8/2005 | Lee et al. | |
| 2006/0210727 A1 | 9/2006 | Ibuki et al. | |
| 2008/0002256 A1 | 1/2008 | Sasagawa | |
| 2008/0218076 A1 | 9/2008 | Kabay et al. | |
| 2008/0311368 A1 | 12/2008 | Tukachinsky | |
| 2009/0145045 A1 * | 6/2009 | Sung | B24D 3/06 51/307 |
| 2010/0190423 A1 * | 7/2010 | Sung | B24D 18/00 451/443 |
| 2011/0117339 A1 | 5/2011 | Baek | |
| 2012/0213968 A1 * | 8/2012 | Hosoda | G02B 5/0226 428/143 |

FOREIGN PATENT DOCUMENTS

| | | | |
|---|---|---|---|
| CN | 101805497 | | 8/2010 |
| EP | 1158314 | | 11/2001 |
| EP | 1213600 | | 6/2002 |
| EP | 1242241 | | 9/2002 |
| JP | 2002174705 | * | 6/2002 |
| JP | 2009-029089 | | 2/2009 |

OTHER PUBLICATIONS

Breil, Chapter 11, "Oriented Film Technology", Multilayer Flexible Packaging, 2009, pp. 119-136, Elsevier Inc.
Breil, Chapter 16, "Multilayer Oriented Films", Multilayer Flexible Packaging, 2009, pp. 231-237, Elsevier Inc.

* cited by examiner

ARTICLES WITH BINDER-DEFICIENT SLIP COATING AND METHOD FOR MAKING SAME

CROSS-REFERENCE TO RELATED APPLICATIONS

This application claims the benefit of U.S. Provisional Application Nos. 61/691,680 and 61/691,688, both filed 21 Aug. 2012.

FIELD

The present invention relates to articles such as polymeric films, e.g., multilayer optical films, with binder-deficient slip coatings and methods for making such articles.

BACKGROUND

Polymer films have found application in myriad uses, e.g., from packaging to multilayer optical films. The manufacture of such films entails formation of single or multiply layered films and handling of such films by passing through roller apparatuses for application of additional layers, exposure to selected treatments to impart desired performance and properties, conversion to select size and configuration, storage, and transport. In typical operations, the polymer film is wound around rollers as it passes through various equipment and is often wound upon itself into roll form.

Important uses of polymeric films include so-called optical films that are used in a wide variety of applications, e.g., mirrors, polarizers, etc., that rely upon uniform film properties. U.S. Pat. No. 5,882,774 (Jonza et al.), U.S. Pat. No. 6,080,467 (Weber et al.), U.S. Pat. No. 6,268,961 (Nevitt et al.), U.S. Pat. No. 6,368,699 (Gilbert et al.), U.S. Pat. No. 6,673,425 (Hebrink et al.), U.S. Pat. No. 6,827,886 (Neavin et al.), and U.S. Pat. No. 8,182,924 (Hebrink et al.) disclose illustrative examples of such films. Illustrative examples of brightness enhancement films and optical assemblies comprising such films are disclosed in U.S. Pat. No. 5,161,041 (Abileah), U.S. Pat. No. 5,771,328 (Wortman et al.), U.S. Pat. No. 5,828,488 (Ouderkirk et al.), U.S. Pat. No. 5,919,551 (Cobb et al.), U.S. Pat. No. 6,277,471 (Tang), U.S. Pat. No. 6,280,063 (Fong), U.S. Pat. No. 6,354,709 (Campbell, et al), U.S. Pat. No. 6,759,113 (Tang), U.S. Pat. No. 7,269,327 (Tang), U.S. Pat. No. 7,269,328 (Tang), and US Patent Appln. Publn. No. 2002/0057564 (Campbell et al.).

Such films exhibit desirable optical properties as selected based on the precise structure of features, e.g., thickness and arrangement of layers with differing refractive indices, etc. The surfaces of films may be marred as they are handled and used, degrading their suitability for the desired ultimate purpose. Accordingly, it is known in the art to provide layers on the outside of such films, sometimes referred to as "premask" or "skin" layers, to protect the films and facilitate handling and use.

The term "skin" or "skin layer" is often used to refer to a layer of a 3- or more-layered film which is at an outer surface of the film. In the case of multilayer optical films, the skin layer or layers (on one or both sides of the film) can be a protective boundary layer or layers introduced during coextrusion and/or layer multiplying that aid in extrusion of the optical layers, or the skin layer or layers can be an additional layer or layers which can be added, for example, in the coextrusion feedblock, or in a subsequent feedblock, or in the die, or can be added after coextrusion of the multilayer film by extrusion coating or other techniques. Skin layers can serve a variety of purposes, such as protection of the interior layers, for example, against scratching or abrasion, stiffening or strengthening or providing dimensional stability to the entire film, hosting additives such as ultraviolet light stabilizers, reducing surface reflection, providing an appropriately receptive surface for subsequent coatings, or others.

The term "premask" is often used to refer to a surface layer, either produced with the rest of the film or added later by such means as lamination, extrusion coating, solvent coating, or other means, intended to protect the film temporarily against damage during handling, processing, converting and the like, and is further intended to be removed before final use of the film or of portions cut from the film. A so-called "strippable skin" can serve as a premask. It will be understood that a film can also be prepared with a skin layer, say, by coextrusion, and have a premask applied thereon, say, by lamination, whereupon the skin layer is no longer, temporarily, the film construction's external-most layer, but is intended at a later time once again to serve as the external layer, after removal of the premask.

A challenge with polymer films is that when contacted to other films, e.g., such as when wound into roll form or arranged into a stack of sheets, the films may tend to adhere strongly if they are too close to having perfectly smooth surfaces. This is sometimes referred to as "blocking", making a roll difficult to unwind or a sheet difficult to remove from the stack. Alternatively, if a film surface is made too slippery, film on a roll may tend to slip upon itself, sideways, resulting in what is often referred to as roll "telescoping". Good roll formation with acceptable unwindability requires that the film surface strike a balance.

U.S. Pat. Nos. 5,328,755 and 5,332,617 (both Mills et al.) disclose formation of particle-filled layers on polymeric films to increase the surface roughness thereof to improve the handling properties thereof.

In some cases, portions of a sheet are roughened, e.g., by imparting knurled portions on the edges thereof, to make the sheets easier to handle and to impart a tendency to "stand off" from articles into which they are contacted, e.g., other sheets in a stack or other portions of the same sheet when wound into roll form. The use of such measures frequently degrade the subject portions of the sheet, thereby reducing yields and incurring additional costs.

The need exists for improved ways to improve the handling properties of polymer films and sheets. In particular, there is a need for a way of improving the handling properties of polymer films that allows a particle-filled layer to be coated onto a film at some point in the film-making process while minimizing the amount of binder polymer needed in the coating.

SUMMARY

The present invention provides a novel polymeric sheet construction that exhibits surprisingly facile performance and handling properties and a novel method for making such novel polymeric sheet constructions.

In brief summary, a sheet of the invention comprises: (1) a core member comprising one or more layers and having a first major surface and (2) a slip control layer as described herein. The slip control layer is disposed on at least a portion of the first major surface and comprises: (i) a footing layer disposed on the first major surface of the core member, (ii) a binder layer disposed on the footing layer, and (iii) an array of particles disposed in the binder layer and footing layer and protruding therefrom. In sheets of the invention, the average diameter of the particles is greater than the combined thickness of the foot layer and binder layer.

Briefly summarizing, the method of the invention for making such sheets comprises: (1) providing a core member comprising one or more layers and having a first major surface; (2) forming a footing layer on at least a portion of the first major surface; (3) applying a binder layer composition containing particles as described herein on at least a portion of the footing layer; then (5) tentering the assembly under sufficient heat to soften the footing layer such that particles sink into the footing layer perhaps so far so as to contact the first major surface of the core member, wherein the average diameter of the particles is greater than the combined thickness of the footing layer and the binder layer.

Sheets of the invention can be easily handled, e.g., during manufacture and subsequent converting. Exploitation of the invention can make possible surprising improvements in runability, reduced waste, and improved yields.

BRIEF DESCRIPTION OF DRAWING

The invention is further explained with reference to the drawing wherein.

Figure 1:
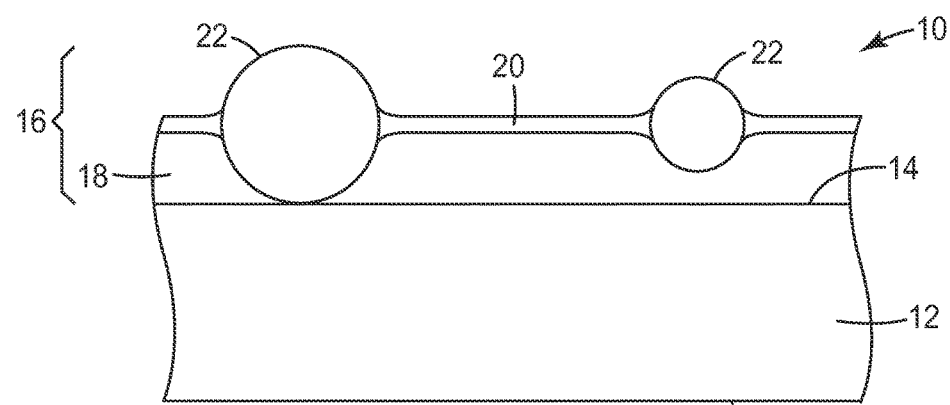
FIG. 1 is a cross-sectional view of a portion of a sheet of the invention.

These figures are idealized, are not to scale and are intended to be merely illustrative and not limiting.

Key and Glossary

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g., 1 to 5 includes 1, 1.5, 2, 2.75, 3, 3.80, 4, and 5). As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

DETAILED DESCRIPTION OF ILLUSTRATIVE EMBODIMENTS

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

As shown in FIG. 1, in brief summary, a sheet of the invention 10 comprises: (1) a core member 12 comprising one or more layers and having a first major surface 14 and (2) a slip control layer 16 disposed on at least a portion of the first major surface. The slip control layer comprises (i) a footing layer 18 disposed on the first major surface 14 of the base member, (iii) a binder layer 20 disposed on the footing layer, and (iii) an array of particles 22 disposed in the binder layer and footing layer and protruding from the surface of the slip control layer opposite the core member. In sheets of the invention, the average diameter of the particles is typically greater than the combined thickness of the footing layer and binder layer though some particles may have diameters which are smaller.

Figure 2:
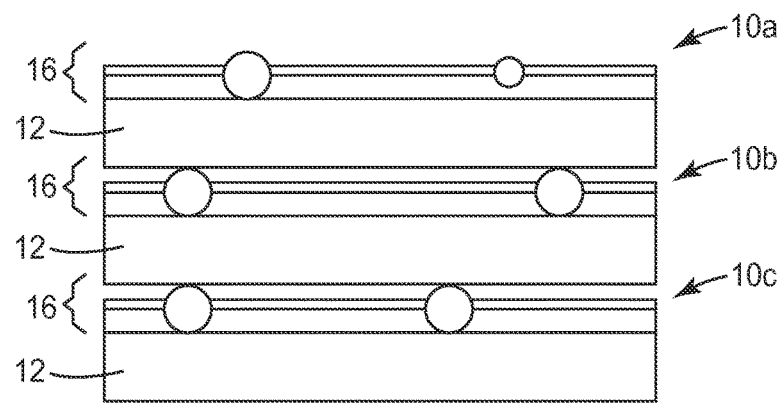
FIG. 2 is an end view of a plurality of sheets of the invention arranged in a stack.
Figure 3:
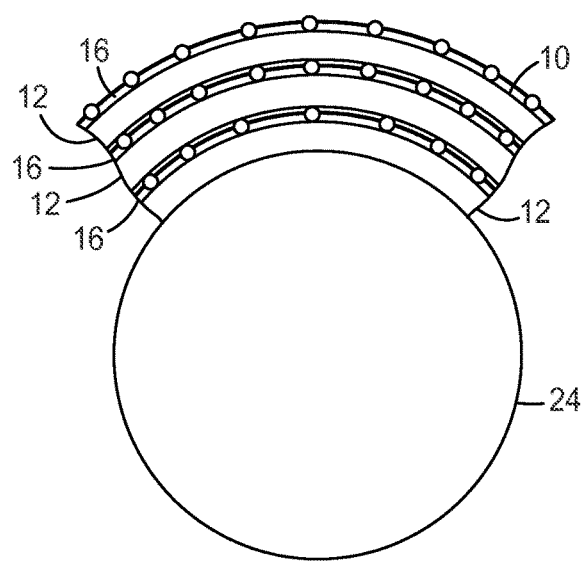
FIG. 3 is an end view of a portion of a sheet of the invention wound into roll form.

A stack of three sheets of the invention 10a, 10b, and 10c is shown in FIG. 2. A portion of a sheet of the invention 10 wound upon itself in roll form on roll core 24 is shown in FIG. 3.

Core Member

In some embodiments, the core member will be a single layer film, e.g., a polyester base film, and in other embodiments the core member may be a multilayer structure, e.g., a multilayer optical film. Illustrative examples of optical films with which the present invention may provide advantageous results include optical base films, multilayer optical films, diffuse reflecting polarizer films, prismatic brightness enhancement films, etc.

Illustrative examples of materials include polyesters selected from the group consisting of homopolymer and copolymer polyesters comprising terephthalate moieties, napthalate moieties, bibenzoate moieties, or combinations thereof.

Footing Layer

The footing layer is disposed on at least a portion of the first major surface of the core member. The footing layer is viscoelastic and has a $T_g$ that is lower than either the $T_g$ or the $T_m$ of the polymer at the first major surface of the core member. In some embodiments, the footing layer has a $T_g$ of at least about 85° C.

In some embodiments, the footing layer may be similar to previously known "skin" layers.

Typically the footing layer is formulated to provide desired adhesion to the underlying major surface of the core member, the overlying binder layer, and the particles, in addition to other properties desired for the specific application. Those skilled in the art will be able to readily select suitable components in accordance with the invention.

In some embodiments, the core member, e.g., a multilayer optical film, and footing layer are formed simultaneously via coextrusion.

In embodiments where the sheet is used for desired optical properties, typically the footing layer is substantially transparent.

In some embodiments, the footing layer is strippable, i.e., removable, from the core member without degradation of the core member. In other embodiments it is intended to remain bonded to the core member.

Typically, the footing layer is from about 0.5 to about 3 microns thick, and in some embodiments, the footing layer is from about 1 to about 1.5 microns thick. As will be understood, footing layers having dimensions outside these ranges may be used if desired.

The footing layer may cover only a limited portion of the area of the first major surface of the core member or it may cover substantially all thereof.

In some embodiments, the core member will have a footing layer on only the one side thereof; in other embodiments, footing layers as described herein may be provided on both the first and second major surfaces 14, 15 of the core member.

Binder Layer

The binder layer 20 covers at least a portion of the footing layer 18.

In embodiments where the sheet is used for desired optical properties, typically the binder layer is transparent.

Typically, after tentering the binder layer is from about 100 to about 500 nanometers thick, and in some embodiments, the binder layer is from about 200 to about 300 nanometers thick.

Typically the binder layer 20 is formulated to provide desired adhesion to the underlying footing layer 18 and the particles 22, in addition to other properties desired for the specific application. Those skilled in the art will be able to readily select suitable components in accordance with the invention.

In some embodiments, the binder layer comprises an olefinic film former, e.g., polypropylene.

Particles

In slip control layers 16 of the invention, the particles 22 protrude therefrom. As used herein, protrude merely means that the particles define an elevation above the intermediate portions of the slip control layer that are defined by the footing layer and the binder layer. The particles may have residual portions of the binder layer precursor materials thereon or may be uncovered and still be considered to "protrude" from the slip control layer.

The particles typically have a mean particle diameter from about 2 to about 30 microns, in some embodiments, from about 3 to about 10 microns. While it is preferred in some instances that the particles have a substantially uniform size, this is not necessary.

It is typically preferred that the particles have a generally spherical shape, though particles having other regular or irregular shapes may be used if desired.

Typically the particles comprise polymeric materials. Illustrative particles suitable for use herein consist essentially of polymethylmethacrylate.

Advantages of the invention include that only scant quantities of the binder layer and particles can be used to achieve desired improvements in sheet handling, reduced roll blocking,e etc. In typical embodiments, the particles constitute from about 5 to about 20 weight percent of the total weight of the particles plus binder layer.

Manufacture

In typical embodiments of the invention, sheets can be made in accordance with the following process:

(1) providing a core member comprising one or more layers and having a first major surface;

(2) forming a footing layer on at least a portion of the first major surface, wherein the footing layer is viscoelastic and has a Tg that is lower than the $T_g$ or the $T_m$ of the polymer at the first major surface of the core member;

(3) applying a binder layer composition comprising a film forming polymer and particles to the surface of the footing layer, typically the thickness of the composition rising to about ⅓ to about ½ or more of the diameter of the particles; then (4) tentering the assembly under sufficient heat to soften the footing layer such that the particles sink into the footing layer, perhaps so far as to contact the first major surface of the core member, wherein the average diameter of the particles is greater than the combined thickness of the footing layer and binder layer.

As discussed above, the footing layer may be formed simultaneously with the core member, e.g., via co-extrusion. If desired, existing core members may be used in the present invention with a footing layer being formed thereon later.

Typically the binder layer and particles are assembled on the sheet by application of a binder layer composition, e.g., an aqueous emulsion containing film forming polyer and particles, as described herein, on select portions of the footing layer.

To form the binder layer, the composition is typically dried. This may be carried out in part or total prior to tentering the sheet or simultaneously therewith.

The tentering step entails heating the assembly to sufficiently high temperature to soften the footing layer and facilitate stretching of the core member.

During tentering, the particle sink into the footing layer and may come into contact with the underlying major surface of the core member. Tentering of films such as core members entails stretching in one or more dimensions, typically under elevated temperatures, and is a well known operation and can be readily carried out by those skilled in the art.

After tentering, the assembly is typically allowed to cool, leaving the assembly stretched in one or more axes in accordance with the tentering process.

Sheets having been manufactured in accordance with the invention can then be more readily handled. For instance, in some embodiments the sheets will be cut to desired size and then stacked, one atop another. In accordance with the invention, the presence of the slip control layer with protruding particles described herein will prevent overlying sheets from wetting out and sticking more strongly to underlying sheets.

In other embodiments, the sheet may be wound into roll form with a plurality of layers.

Conventionally, when sheets such as optical films are manufactured they are wound into large rolls referred to as jumbos, which are then manipulated, stored, transported to subsequent manufacturing operations or customers, etc. When wound into a roll, the sheet is under tension and quantities of air are entrapped therein. Over time, the sheet may exhibit some relaxation in the machine or roll direction which impacts the tension through the roll. Also over time, the entrapped air may escape, causing the stability of the rolled sheet to change. Such changes may lead to wrinkling or other damage to portions of the roll that can render significant portions of the sheet unuseable. Sheets rolled in accordance with the present invention exhibit significant reduction or even elimination of such defects.

Also, in accordance with the invention, the presence of the slip control layer with protruding particles as described herein will prevent overlying portions of sheet from wetting out and sticking more strongly to underlying portions of the sheet. As such, jumbo rolls of expensive sheets such as optical films can be more easily and efficiently manufactured, stored, transported, and handled.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The complete disclosure of all patents, patent documents, and publications cited herein are incorporated by reference.

What is claimed is:

1. A process for making a sheet comprising:
   (1) providing a polymeric core member comprising one or more layers and having a first major surface;
   (2) forming a footing layer on at least a portion of the first major surface, wherein the footing layer is viscoelastic and has a $T_g$ that is lower than either the $T_g$ or the $T_m$ of the polymer at the first major surface of the core member;
   (3) applying a binder layer composition comprising a film forming polymer and particles to the surface of the footing layer to yield an assembly; then
   (4) tentering the assembly under sufficient heat to soften the footing layer such that the particles sink into the footing layer, the footing layer, binder layer, and particles constituting a slip control layer, wherein the average diameter of the particles is greater than the combined thickness of the footing layer and binder layer such that the particles protrude from the surface of the slip control layer opposite the core member.

2. The process of claim 1 wherein the core member comprises multilayer optical film.

3. The process of claim 1 wherein the footing layer and core member are formed simultaneously via coextrusion.

4. The process of claim 1 wherein the footing layer is amorphous.

5. The process of claim 1 wherein the footing layer has a $T_g$ of at least about 85° C.

6. The process of claim 1 wherein the footing layer is from about 0.5 to about 3 microns thick.

7. The process of claim 1 wherein the binder layer composition comprises a film forming component, particles, and water.

8. The process of claim 1 wherein the binder layer composition is applied to the surface of the footing layer and self-levels.

9. The process of claim 1 wherein the binder layer composition is at least partially dried before tentering.

10. The process of claim 1 wherein the binder layer after tentering is from about 100 to about 500 nanometers thick.

11. The process of claim 1 wherein the binder layer composition further comprises one or more additives selected from the group consisting of leveling agents, fire retardants.

12. The process of claim 1 wherein the binder layer composition is dried to form a film with an array of the particles therein.

13. The process of claim 1 wherein a mean particle diameter of the particles is from about 2 to about 30 microns.

14. The process of claim 1 wherein some particles sink into the footing layer so far as to contact the first major surface of the core member.

15. The process of claim 1 further comprising arranging a plurality of the sheets in a stack wherein each sheet is arranged in substantially planar form.

16. The process of claim 1 further comprising winding the sheet upon itself into roll form.

17. The process of claim 16 wherein said winding is pack winding wherein the rolled sheet is pressed against a back up roller when wound upon a jumbo to reduce the amount of entrained air.

* * * * *